United States Patent [19]

Harris

[11] 4,395,322
[45] Jul. 26, 1983

[54] CATALYTIC ELECTRODE

[75] Inventor: Lawrence A. Harris, Schenectady, N.Y.

[73] Assignee: General Electric Company, Schenectady, N.Y.

[21] Appl. No.: 322,482

[22] Filed: Nov. 18, 1981

[51] Int. Cl.$^3$ ............................................. C25B 11/00
[52] U.S. Cl. ................................. 204/290 F; 429/40; 429/44; 252/425.3
[58] Field of Search ................ 204/290 F; 429/40, 44; 252/425.3

[56] References Cited

U.S. PATENT DOCUMENTS

| | | | |
|---|---|---|---|
| 3,096,272 | 7/1963 | Beer et al. | 204/290 F |
| 3,852,175 | 12/1974 | Hoekje | 204/98 |
| 4,044,193 | 8/1977 | Petrow et al. | 429/44 |
| 4,056,642 | 11/1977 | Saxema et al. | 427/88 |
| 4,115,628 | 9/1978 | Bonnemay et al. | 429/44 |
| 4,257,856 | 3/1981 | Beni et al. | 204/290 F |

Primary Examiner—John F. Niebling
Attorney, Agent, or Firm—Jane M. Binkowski; James C. Davis, Jr.; James Magee, Jr.

[57] ABSTRACT

A catalytic electrode is produced by sputter etching the surface of a conductor with ions of an inert gas to remove oxide therefrom and introduce disorder into the surface making it chemically reactive and depositing a catalytic metal on the etched surface of the conductor in at least a catalytic amount.

12 Claims, No Drawings

CATALYTIC ELECTRODE

This application is a division of application Ser. No. 200,509, filed Oct. 24, 1980, U.S. Pat. No. 4,328,080.

The present invention relates to the production of catalytic electrodes.

Platinum and palladium films have long been deposited on silicon in thicknesses greater than 500 Angstroms by workers in the solid-state electronic field, to produce Schottky diodes. Rarely is care taken to remove all the native oxide on the Si, and the junctions so formed are usually annealed in an inert atmosphere to produce Pt or Pd silicides. These metallic compounds form a Schottky barrier at the Si surface.

Very thin films of platinum or palladium have been deposited on single crystals of silicon carefully cleaned by repeated sputter etching and annealing and then depositing the films on the annealed restored surface of the crystal in ultrahigh vacuum systems in the course of research studies.

The present method is much simpler and more amenable to routine technical methods. It also produces a novel catalytic electrode.

One object of this invention is to modify the surface of silicon so that it can be used in aqueous electrochemical systems, for example to electrolyze HBr. Without appropriate surface coating the silicon readily oxidizes and becomes inactive as an electrode.

Another object of this invention is to fabricate catalytic electrodes, for use in fuel cells or as oxygen electrodes in batteries, that use as little as possible of the expensive catalytic metal.

Briefly stated, the present method comprises providing a catalytic metal, providing a supporting electrical conductor that forms a protective oxide on its surface and forms a compound with said catalytic metal, sputter etching a predetermined surface of said conductor with ions of an inert gas to remove oxide therefrom and introduce disorder into the etched surface making it chemically reactive, and depositing a catalytic metal onto said etched surface of said conductor in a thickness of at least about 10 Angstroms and in at least a catalytic amount, said etching and deposition being carried out under a partial vacuum which is at least sufficient to have no significant deleterious effect thereon.

In the present invention, smooth continuous films of platinum, as little as 20 Angstroms thick, can be deposited on silicon that is sufficiently ion etched beforehand. The smoothness and uniformity of the present deposited Pt films may be attributed to the immobility of the first Pt atoms arriving at the chemically clean and active Si surface. Since Pt and Si interact to form distinct compounds, the initial Pt atoms are likely to be chemisorbed with sufficient binding energy to prevent their subsequent migration over the surface. The films display the electrochemical characteristics of platinum metal and are very stable under strongly oxidizing conditions.

The present supporting electrical conductor, i.e. substrate, is a material that forms a protective oxide on its surface and forms a compound with the deposited catalytic metal. By a material that forms a protective oxide on its surface it is meant herein one which, when exposed to air or water at ambient temperatures, reacts to form an oxide film on its exposed surface. The presence of a compound formed between the conductor and the catalytic metal can be determined by a number of surface analysis techniques such as, for example, Auger spectroscopy and Rutherford back scattering techniques. Representative of such a conductor is silicon, titanium, tantalum and niobium.

The present catalytic metal is one which imparts the required catalytic activity to the supporting conductor making it useful as an electrode. Representative of useful catalytic metals is platinum, palladium, nickel, rhodium and iridium.

In the present process, positive ions of a chemically inert, i.e. noble, gas are used to sputter etch a predetermined surface of the supporting conductor to remove oxide therefrom and introduce disorder into the conductor surface to make it chemically reactive. Preferably, the inert gas is argon. Also preferred are inert gases heavier than argon such as xenon and krypton. On the other hand, inert gases lighter than argon, such as helium and neon, although useful are not as practical since the sputtering rate decreases with these lighter gases. The predetermined surface is that portion or side of the resulting structure, i.e. catalytic electrode, which will be in contact with electrolyte.

Preferably, the present supporting conductor is cleaned before being used. For best results, it is degreased, for example, by dipping in acetone. Also, for best results, the present supporting conductor is treated with acid to remove excess amounts of oxide therefrom. The particular acid used depends largely on the conductor. For example, the oxide of silicon is removed by hydrofluoric acid.

There are a number of techniques by which the present process can be carried out all of which utilize a vacuum chamber. The present process can be carried out in commercially available apparatus. The conductor and the catalytic metal are suitably positioned within the vacuum chamber, i.e. the conductor initially being positioned for sputter etching of its surface and the catalytic metal initially being positioned so that it is not significantly affected by the sputter etching of the conductor. The chamber is then evacuated to at least a partial pressure which makes it free of significant contaminants. Generally such initial partial pressure is at most about $1 \times 10^{-5}$ torr.

The predetermined surface of the conductor is then sputter etched with positive ions of the inert gas to remove oxide therefrom and to introduce disorder into the surface of the conductor to make it chemically reactive. Although the inert gas raises the pressure somewhat, the evacuated chamber is maintained under a partial vacuum which has no significant deleterious effect on the rate of sputter etching and which is determinable empirically. Generally, for an ion beam sputtering system, such partial vacuum ranges from about $1 \times 10^{-4}$ torr to about $2 \times 10^{-4}$ torr. For best results, the preferred rate of sputter etching with the ions of inert gas ranges from about 100 Angstroms per minute to about 400 Angstroms per minute.

Sputter etching time to remove oxide depends largely on the extent of oxide and rate of etching and is determinably empirically. After removal of oxide, sputter etching time to introduce disorder into the crystal structure of the supporting conductor and make the etched surface chemically reactive also is determined empirically and depends largely on the particular conductor and the rate of sputter etching. Generally, the time period for sputter etching the surface of the conductor to introduce disorder into the crystal structure and make the surface chemically reactive ranges from about 4 times to about 20 times longer than the sputter etching time to remove oxide therefrom. The surface of the electrode is made chemically reactive so that it can react with the catalytic metal atoms to form a compound therewith. For example, the rate at which $SiO_2$ is removed from the surface may be estimated from the ion current density, ion voltage and sputtering rate of Si by argon ions, assuming the rate for $SiO_2$ approximates that for Si. For an estimated rate of 5.35 A/sec, 4 seconds of ion etching should be sufficient to remove an assumed 20 Angstroms of $SiO_2$. In practice, about 20 seconds of ion etching are required for good results, i.e. to remove the oxide and introduce disorder in the substrate to attain good adhesion and stability of the deposited films.

The catalytic metal is then deposited on the etched surface of the conductor within the evacuated chamber, i.e. the chamber being maintained under a partial vacuum which is at least sufficient to have no significant deleterious effect on the conditions of deposition and such partial vacuum can be the same as that maintained for sputter etching. In a controlled system, the conductor usually is repositioned within the evacuated chamber for its etched surface to suitably receive the catalytic metal. Deposition can be carried out by sputtering the catalytic metal with the positive ions of the inert gas used for sputter etching. The rate of such sputtering usually ranges from about 100 Angstroms per minute to about 300 Angstroms per minute. Alternatively, deposition can be carried out by heating the catalytic metal by conventional means to vaporize it and vapor deposit it on the etched surface of the conductor.

The catalytic metal is deposited on the etched surface of the conductor in a minimum thickness of about 10 Angstroms and in at least a catalytic amount. Thicknesses significantly smaller than about 10 Angstroms do not provide the required catalytic activity and stability to the conductor to make it useful as an electrode. The particular thickness of deposited metal depends on the particular use of the catalytic electrode. The thicker the deposit, the longer is the lifetime of the electrode, but then the cost increases significantly. The catalytic metal is deposited in at least a catalytic amount, i.e. it is deposited on at least sufficient surface area of the conductor to impart at least sufficient catalytic activity thereto to make the resulting structure useful as an electrode.

The deposited metal can be deposited in a number of forms. It can be discontinuous such as, for example, in the form of discrete islands, or it can be continuous such as in the form of an interconnected network, for example, a continuous film with pinholes therein. It also can be a totally continuous film, i.e. a solid film or coating with no discontinuities or pinholes therein. Usually, thinner deposits of catalytic metal are in the form of discrete islands, and as the thickness of the deposited metal increases, it becomes an interconnected network, and finally with still increasing deposition thickness, i.e. a thickness of the order of about 20 Angstroms to about 25 Angstroms, it becomes a totally solid continuous film, i.e. a film or coating with no pinholes or discontinuities therein. Once a continuous totally solid film or coating is deposited on the conductor, additional deposition of catalytic metal does not improve the catalytic activity of the electrode but it is likely to improve its lifetime.

The deposited metal is highly adherent to the conductor. Specifically, the present deposited metal is stabilized by chemical reaction of the deposited atoms with the active clean surface on the etched substrate. The deposited catalytic metal is stable electrochemically because any exposed areas of the substrate form inert, insoluble and insulating oxides, thus preventing any undermining or detachment of the deposited metal.

In one embodiment, the present process is carried out in a radio frequency sputtering system.

In a preferred embodiment, an ion beam sputtering system is used to carry out the present process. In such a system, the sputtering or vacuum chamber is associated with an inert ion beam source such as an ion beam gun. Preferably, to provide good control, a movable protective means, such as a shutter, is positioned within the chamber to block off the beam of ions when desired. Preferably, the conductor is initially positioned to receive the ion beam for etching, and then it is positioned for its etched surface to suitably receive deposition of the catalytic metal.

The invention is further illustrated in the following examples where the procedure used was as follows unless otherwise stated:

The silicon substrate samples used were single-crystal, semiconductor grade polished wafer discs of silicon. Both n- and p-type silicon wafers, having resistivities from 1 or 2 to about 50 ohm-cm, and with (100) or (111) faces exposed, were used. The wafers were typically 10 to 12 mils thick and up to about 2 inches in diameter. They were degreased in acetone and methanol, then rinsed in distilled water and finally cleaned in dilute HF to remove much of the native oxide before they were mounted in the vacuum system.

The titanium, tantalum, and niobium substrates were cut from sheets of metal and were about 1/16 inch thick and about ⅜ inch square. They were degreased in acetone and methanol, then rinsed in distilled water and finally cleaned in a dilute mixture of hydrofluoric and nitric acids.

After removal from the vacuum system, the catalytic metal coated wafers were cut into pieces suitable for electrochemical tests or for examination of the catalytic metal films in the transmission electron microscope. For the structures with Si substrates, ohmic contacts of a Ga-Ag paste were applied to the back (uncoated) side after a local etch with a drop of HF to remove any $SiO_2$.

The electrochemical tests were done in a specially constructed, three-compartment Pyrex cell. The sample, i.e. test electrode, was pressed against a Viton gasketted opening in the central working compartment, opposite a flat window through which the sample could be illuminated. This arrangement defined the exposed area (⅛ cm$^2$) of the electrode and permitted quick and easy replacement of test electrodes. To provide for effective stirring of the electrolyte and to prevent bubble accumulation at the test electrode surface a centrifugal pump was incorporated at the base of the working compartment. This pump directed a stream of electrolyte through a glass jet aimed across the working test electrode face. The remainder of the cell was of conventional design, with a Luggin capillary connecting the reference (hydrogen) electrode chamber to the electrolyte near the working test electrode, and a fine capillary diffusion barrier connecting the counter electrode chamber to the working test electrode chamber. Most of the tests were done with 1N $H_2SO_4$ electrolyte made from analytical concentrate diluted with quartz-distilled water. Purified $H_2$ or He could be bubbled through each chamber of the cell or maintained as an atmosphere over the electrolyte. Electrochemical characteristics were measured with a potentiostat and recorded with an x-y recorder to produce cyclic voltammograms.

For electron microscopic examination, the catalytic metal films, in some cases coated with carbon and in others uncoated, were separated from the Si wafers by exposure to a mixture of $HNO_3$ and HF or to their vapors and then floated off on quadruple-distilled water. They were picked up on "holey" carbon supporting films for insertion in the microscope.

EXAMPLE 1

A commercially available radio-frequency (rf) sputtering system was used. The clean silicon substrate was placed in the system mounted on a holder. The system then was evacuated to a base pressure of $1 \times 10^{-5}$ torr, after which pure argon gas was admitted to a pressure of $1.8 \times 10^{-2}$ torr.

For sputter etching of the silicon by argon ions, the silicon sample and its holder were moved within the evacuated chamber to a neutral position where material sputtered from the silicon sample would not contaminate sources of material to be sputtered subsequently. With all elements grounded except the silicon sample and its holder, an rf voltage at 13.5 MHz was applied to the silicon holder and adjusted to put 500 watts of rf power into the resulting argon gas discharge. This condition was held for 30 seconds during which time the exposed surface of the silicon sample was bombarded with argon ions, and at the end of the 30-second bombardment, the rf voltage was removed. The argon ion bombardment was sufficient to remove oxide from the surface of the silicon and introduce disorder into the etched surface making it chemically reactive.

To deposit platinum on the etched surface of the silicon, the silicon sample holder was moved within the still evacuated system to a position facing the platinum disk or target. While the silicon sample and all other elements were grounded, an rf voltage at 13.5 MHz was applied to the platinum target holder and the power was adjusted to put 50 watts of power into the resulting argon gas discharge. This condition was maintained for 5 seconds during which tim argon ions sputtered platinum onto the etched bonding surface of the silicon resulting in deposition of an adherent film of platinum estimated to be about 15 Angstroms thick. At this point the deposition was complete, the power was turned off, all elements allowed to cool, and the system opened.

The deposited platinum film was highly adherent to the silicon and coated the entire etched surface thereof.

EXAMPLE 2

In this example an ion beam sputtering system was used. A commercially available 3-inch "Microetch" system was used. The clean silicon sample was mounted on the system's sample holder and the system was evacuated to a base pressure of $1 \times 10^{-6}$ torr. Pure argon was then admitted to a pressure of approximately $1 \times 10^{-4}$ torr, and the system was maintained at this pressure throughout the sputter etching of the silicon sample and throughout the subsequent sputter deposition of the catalytic metal. An argon gas discharge was then established within the ion-gun portion of the system by heating a tungsten cathode to emit electrons and by applying sufficient voltage to an accelerating electrode to produce a discharge current of 0.75 to 1 ampere. Argon ions were withdrawn from the gun to form an ion beam by applying an appropriate voltage to the accelerating grids of the gun. In this way a beam of $Ar^+$ ions with a current density of about 1 ma/$cm^2$ and energy of 500 ev was formed. This beam could be blocked by a metal shutter that could be manually rotated into its path just below the grids.

To sputter etch the silicon, the silicon sample holder was positioned so the sample lay in the path of the beam just below the closed shutter. The rate of sputter etching was about 5 Angstroms/second. The shutter was opened exposing the sample to the beam for 20 seconds and then closed again. This was sufficient to remove oxide and make the etched surface chemically reactive.

To deposit platinum onto the etched silicon, the silicon sample holder was moved out of the ion beam path and placed so that its etched face lay parallel to the beam and facing the diagonally mounted Pt target which was in the beam path farther below the shutter. When the shutter was opened, $Ar^+$ ions struck the platinum target sputtering Pt atoms from it. The rate of sputter deposition was about 3 Angstroms/second. Some of these deposited on the etched silicon and on the quartz-crystal film thickness monitor mounted beside the silicon sample. When this monitor indicated that the desired amount of platinum had been deposited, the shutter was closed, the discharge and ion beam turned off, the argon pumped out and the hot elements of the system allowed to cool to room temperature. Air was then admitted to the system and it was opened for removal of the coated silicon sample.

The deposited platinum film was about 20 Angstroms thick, and coated the entire etched area which was almost 2 inches in diameter and was highly adherent to the silicon. Electron microscopic examination of the platinum film showed it to be a continuous totally solid film.

Example 2 is further illustrated in Table I.

The ion beam sputtering system used in Example 2 was used in all of the tabulated examples of Table I. Also, the procedure used in the tabulated examples of Table I was substantially the same as that set forth in Example 2 unless otherwise noted. The deposited catalytic metal covered the entire etched surface of the substrate.

TABLE I

| Example | Substrate | Sputter Etch Time (sec) | Deposited Catalytic Metal | Thickness of Cat. Metal | Resulting Structure |
| --- | --- | --- | --- | --- | --- |
| 2 | n-type Si | 20 | Pt | ~20Å | Voltammograms like Pt, stable |
| 3 | n-type Si | 60 | Pt | ~10Å | Voltammograms like Pt, short lived |
| 4 | p-type Si | 60 | Pt | ~10Å | Strong photo effects, electronic barrier |
| 5 | n-type Si | 3 | Pt | ~20Å | Voltammograms unlike Pt, stable |
| 6 | n-type Si | 0 | Pt | ~20Å | Voltammograms unlike Pt, unstable |
| 7 | Ti metal | 60 | Pt | ~20Å | Voltammograms like Pt, stable |
| 8 | n-type Si | 60 | Au | ~20Å | Voltammograms unlike Au, unstable |
| 9 | n-type Si | 60 | Au | ~40Å | Initial Voltammograms like Au, unstable |
| 10 | Ta metal | 120 | Pt | ~25Å | Voltammograms like Pt, stable |
| 11 | Nb metal | 120 | Pt | ~25Å | Voltammograms like Pt, stable |

TABLE I-continued

| Example | Substrate | Sputter Etch Time (sec) | Deposited Catalytic Metal | Thickness of Cat. Metal | Resulting Structure |
|---|---|---|---|---|---|
| 12 | n-type Si | 60 | Pd | ~20Å | Voltammograms like Pd, moderately stable |

Examples 2, 3, 7, 10, 11 and 12 illustrate the present invention. The useful catalytic properties of the products of these samples were shown by their cyclic voltammograms which were substantially the same or similar to those produced by the corresponding pure catalytic metal tested under similar conditions.

The tendency of uncoated Si to oxidize in aqueous electrolytes was also demonstrated in voltammograms.

It was found that as little as 20A of Pt on Si, i.e. the product of Example 2, radically alters the electrochemical properties of the substrate. Specifically, for the product of Example 2, the hydrogen overvoltage was extremely low, characteristic of Pt, and quite insensitive to operation of the electrode at positive voltages. Stable cyclic voltammograms were obtained for the product of Example 2 and for Pt metal sheet tested under similar conditions. The similarity of the voltammograms was striking. The stability of the product of Example 2 under strongly oxidizing conditions was shown by cyclic voltammograms taken before and after oxidation at 1.6 V (RHE) for about 32 hours. A subsequent week long test (168 hours) on a similar sample held at 1.75 volts showed the Pt activity undiminished in this time. When, however, this catalytic electrode was repeatedly cycled, the Pt-like character was considerably degraded in about 25 hours (2900 cycles), though there was no evidence of increasing overvoltages like those shown for uncoated Si.

Since cyclic voltammograms are produced under severe oxidizing conditions, the product of Example 3 was short lived, functioning for about 25 minutes, presumably due to dissolution of the thin Pt film in electrolyte.

In Example 4, the p type Si forms a Schottky barrier under these conditions and is not normally useful as a substrate for a catalytic electrode.

Examples 5 and 6 illustrate the criticality of the present etching procedure.

Examples 8 and 9 show that gold is not operable in the present invention apparently because it does not form a compound with Si.

The micrograph of the catalytic metal film deposited in Example 3 showed many pinholes but nevertheless it was a continuous, conducting film.

What I claim as new and desire to secure by Letters Patent of the United States is:

1. A catalytic electrode consisting essentially of a supporting electrical conductor carrying an adherent catalytic metal in a thickness of at least about 10 Angstroms and in at least a catalytic amount on a predetermined surface thereof, said electrical conductor being selected from the group consisting of silicon, titanium, tantalum, and niobium, and said catalytic metal being selected from the group consisting of platinum, palladium, nickel, rhodium, and iridium.

2. A catalytic electrode according to claim 1 wherein said catalytic metal is in the form of discrete islands.

3. A catalytic electrode according to claim 1 wherein said catalytic metal is in the form of a continuous interconnected network.

4. A catalytic electrode according to claim 1 wherein said catalytic metal has a thickness of at least about 20 Angstroms and is in the form of a continuous solid film.

5. A catalytic electrode consisting essentially of an electrical conductor of silicon supporting adherent platinum on a predetermined surface thereof, said platinum being present in at least a catalytic amount and having a thickness of at least about 10 Angstroms.

6. A catalytic electrode according to claim 5 wherein said platinum is in the form of discrete islands.

7. A catalytic electrode according to claim 5 wherein said platinum is in the form of a continuous interconnecting network.

8. A catalytic electrode consisting essentially of an electrical conductor of silicon supporting an adherent continuous film of platinum on a predetermined surface thereof, said platinum film having a thickness of at least about 20 Angstroms.

9. A catalytic electrode consisting essentially of an electrical conductor supporting an adherent catalytic metal in a thickness of at least about 10 Angstroms and in at least a catalytic amount on a predetermined surface thereof, said electrical conductor being selected from the group consisting of silicon, titanium, tantalum, and niobium, said catalytic metal being selected from the group consisting of platinum, palladium, nickel, rhodium, and iridium, and any exposed surface of said electrical conductor having a protective oxide thereon.

10. A catalytic electrode consisting essentially of an electrical conductor supporting an adherent continuous film of a catalytic metal in a thickness of at least about 20 Angstroms on a predetermined surface thereof, said electrical conductor being selected from the group consisting of silicon, titanium, tantalum, and niobium, said catalytic metal being selected from the group consisting of platinum, palladium, nickel, rhodium, and iridium, and any exposed surface of said electrical conductor having a protective oxide thereon.

11. A catalytic electrode consisting essentially of an electrical conductor of silicon supporting adherent platinum on a predetermined surface thereof, said platinum being present in at least a catalytic amount and having a thickness of at least about 10 Angstroms, and any exposed surface of said silicon having a protective oxide thereon.

12. A catalytic electrode consisting essentially of an electrical conductor of silicon supporting an adherent continuous film of platinum on a predetermined surface thereof, said platinum film having a thickness of at least about 20 Angstroms, and any exposed surface of said silicon having a protective oxide thereon.

* * * * *